United States Patent [19]

McAvoy

[11] 4,032,088
[45] June 28, 1977

[54] OUTRIGGER AIR BAG LANDING SYSTEM

[75] Inventor: John Jerome McAvoy, Seattle, Wash.

[73] Assignee: The Boeing Company, Seattle, Wash.

[22] Filed: Apr. 8, 1976

[21] Appl. No.: 675,004

[52] U.S. Cl. .................... 244/100 A; 244/102 R
[51] Int. Cl.² ..................................... B64C 25/56
[58] Field of Search ....... 244/102 R, 100 A, 100 R, 244/105; 180/116, 117, 124, 127

[56] References Cited

UNITED STATES PATENTS

| | | | |
|---|---|---|---|
| 2,153,266 | 4/1939 | Minshall et al. | 244/102 R |
| 2,463,351 | 3/1949 | Bowers | 244/102 R |
| 3,004,737 | 10/1961 | Boyle et al. | 244/102 R |
| 3,273,832 | 9/1966 | Keedy | 244/105 |
| 3,524,517 | 8/1970 | LeFleur | 180/124 |
| 3,869,103 | 3/1975 | Nelson et al. | 244/100 R |
| 3,964,698 | 6/1976 | Earl | 244/100 A |

FOREIGN PATENTS OR APPLICATIONS 1,493,337  7/1967  France .................. 180/127

Primary Examiner—Trygve M. Blix
Assistant Examiner—Barry L. Kelmachter
Attorney, Agent, or Firm—Mark J. Zovko, Jr.

[57] ABSTRACT

An air bag landing system for an aircraft. The landing system has an air bag assembly which is stored in the fuselage of the aircraft during cruise and which extends for landing. The assembly consists of a rigid arm with either two or three folding portions and an inflatable bag attached to the underside of the arm. The inflatable bag cushions the impact of the aircraft at landing. Actuators are provided to extend and retract the assembly.

2 Claims, 12 Drawing Figures

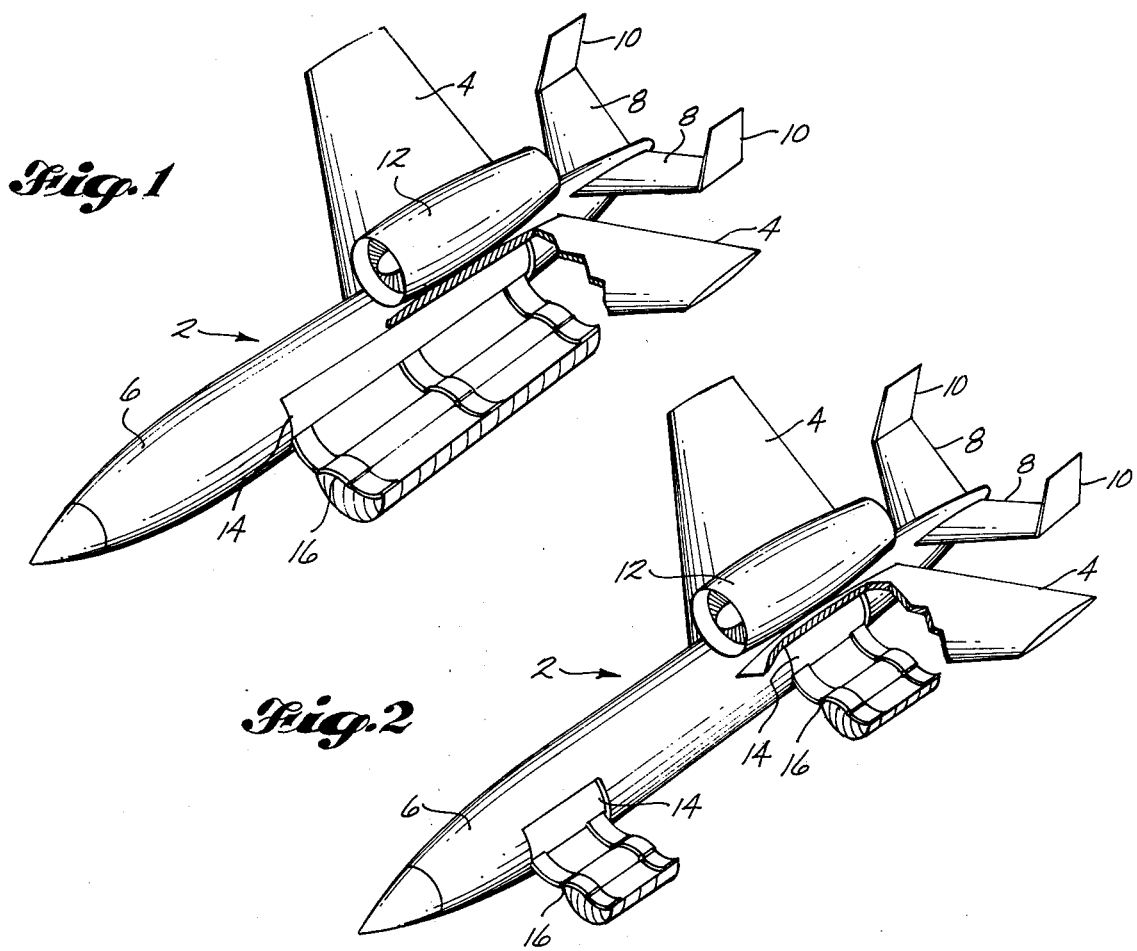
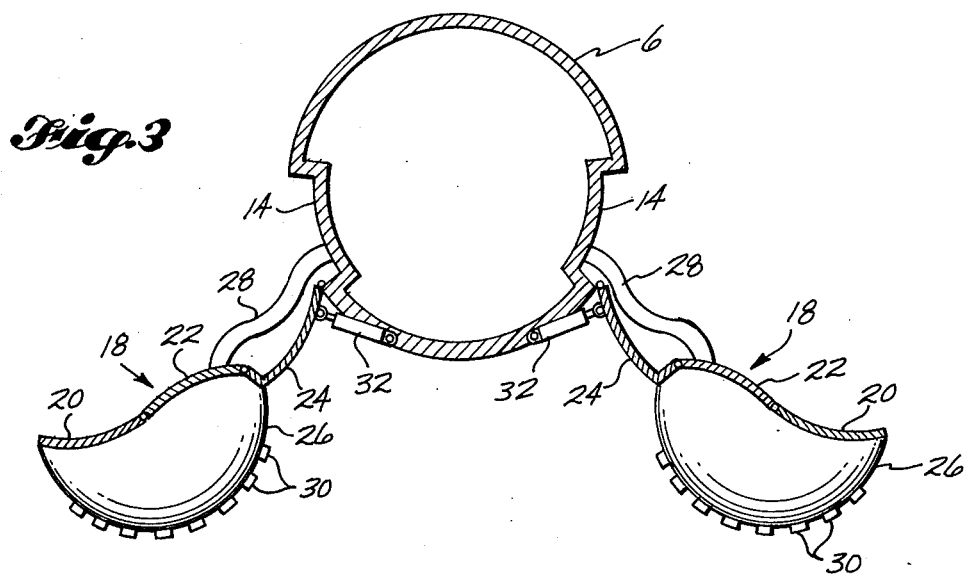

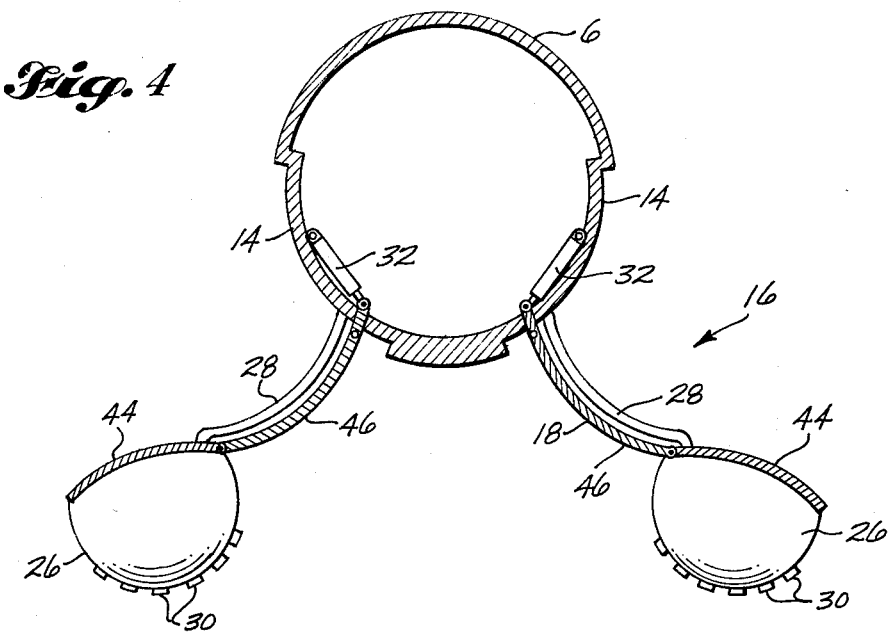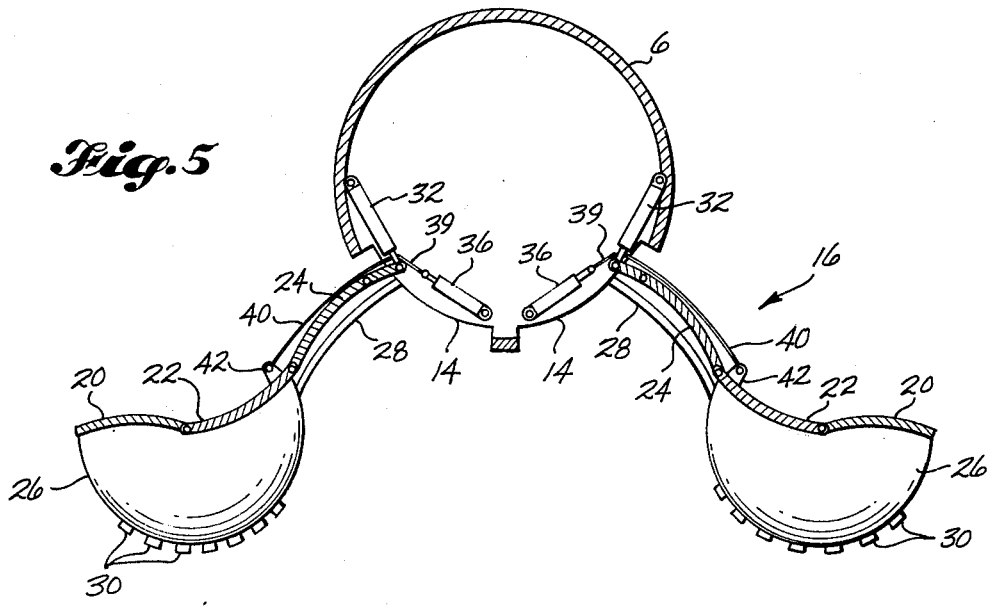

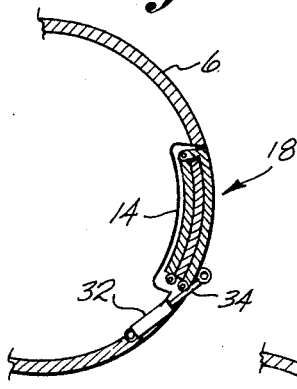
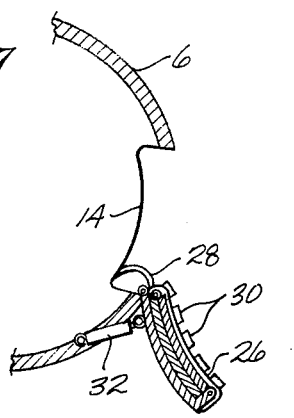
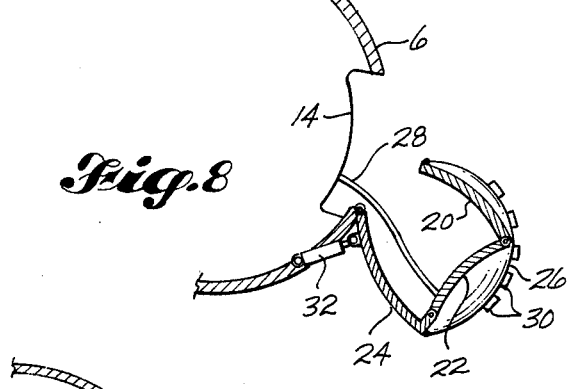
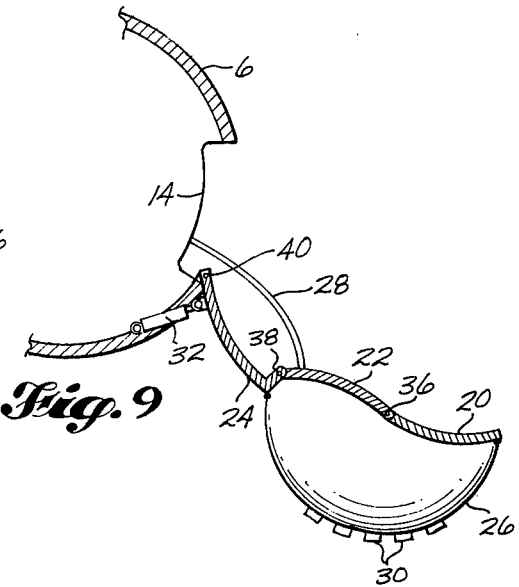
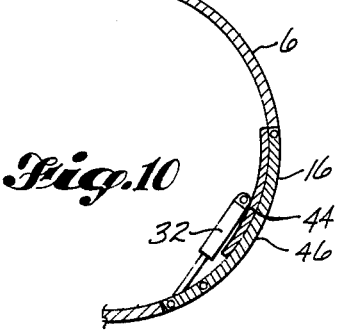
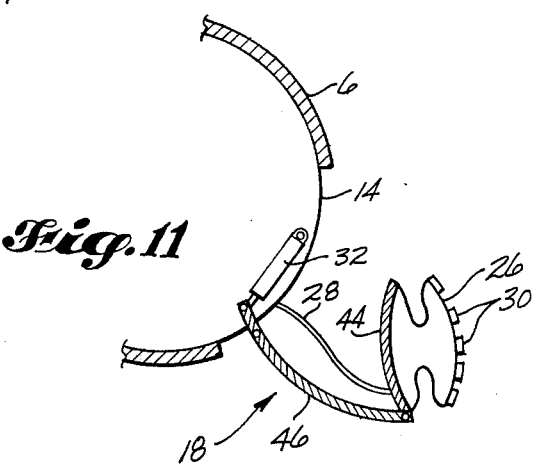
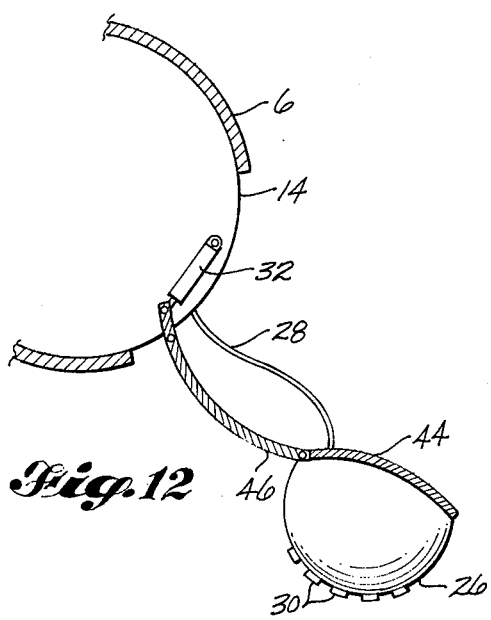

OUTRIGGER AIR BAG LANDING SYSTEM

BACKGROUND OF THE INVENTION

1. Field of the Invention

This disclosure relates in general to a landing system for aircraft, and more particularly to a retractable air bag landing system for aircraft.

2. Description of the Prior Art

It is already known in the prior art to provide a cushioned landing system for certain aircraft using inflatable air bags. Present air cushion landing system concepts consist of providing an air bag shaped like an elongated donut. This air bag is commonly called the trunk. The trunk of the air cushioned landing system is usually inflated and provides a skirt to contain air pressure between the ground and the aircraft fuselage. The trunk also functions to attenuate landing impact of the aircraft at the time of touchdown.

The main difficulty with the above described system which includes an impact absorbing trunk concerns retraction of the trunk after takeoff of the aircraft.

For remotely piloted vehicles, the problem has been avoided by utilizing two trunks — one for takeoff, and an alternate or spare trunk for recovery of the aircraft. In this dual trunk system, a remotely piloted vehicle will lift off with the recovery trunk folded and stored in a bag beneath the takeoff trunk. After liftoff, the takeoff trunk is dropped from the aircraft. When the remotely piloted vehicle lands, the recovery trunk is inflated from engine bleed air lines, and "pops out" of the bag which had previously contained it during takeoff and cruise. After landing is accomplished, the recovery trunk is replaced by hand folding. The present invention concerns a novel system which facilitates retraction of the air cushion bags and has other advantages that will be apparent forthwith.

Other attempts to solve the problem of retraction of the air cushion landing system include using an elastic trunk. The purpose in using an elastic trunk is to facilitate storing of the trunk when it is not in use. When the trunk is not in use it remains unpressurized and deflated, and is contracted against the fuselage of the aircraft. Many difficulties arise, however, from the use of elastic trunks. The elastic trunks are relatively expensive and also cause various dynamic problems during operation of the aircraft.

Other retraction systems in the prior art for retracting the trunk portion of an air cushion landing system require a large volume for trunk storage and involve a complex web of cables and pulleys for retraction.

A novelty search of the prior art relating to air cushion landing systems discovered the following U.S. Patents:

| U.S. Pat. No. | Classification | Inventor |
|---|---|---|
| 2,944,771 | 244/100 | O. J. Bush |
| 3,258,080 | 180/127 | G. H. Williams, et.al. |
| 3,297,280 | 180/116 | Shao-Tang LEE |
| 3,384,197 | 180/117 | A. E. Bingham, et.al. |
| 3,802,602 | 244/100 | F. W. Wilson |
| 3,826,449 | 244/100 | Nelson, et.al. |
| 3,865,332 | 244/100 | A. V. Coles |
| 3,869,103 | 180/124 | Nelson, et.al. |
| Also, one British patent was discovered: | | |
| BR 1,089,464 | 180/127 | Rowland Hunt |

A close approach to the proposed construction of the present invention was not observed in the above cited patents. Perhaps of most merit are U.S. Pat. Nos. 3,869,103, 3,258,080 and British Pat. No. 1,089,464. U.S. Pat. No. 3,869,103 describes a system for retracting the "elongated donut" trunk. This system, however, requires a relatively complex array of cables and pulleys which are not needed in the present invention. U.S. Pat. No. 3,258,080 and British Pat. No. 1,089,464 show rigid pivoted structures and air bag means employed in various arrangements. In these patents, however, the simplicity and effectiveness inherent in the present invention is lacking.

SUMMARY OF THE INVENTION

The present invention provides an air bag landing system which includes a pair of rigid arms having a first and second portion. The first portions of the rigid arms are mounted to the fuselage of the aircraft toward its underside. The second portions of the rigid arms are mounted to the ends of the first portions of the rigid arms. An inflatable bag is sealably mounted to the underside of each rigid arm. The inflatable bags can be inflated from engine bleed air and serve to cushion the aircraft at landing. An actuating system is provided which retracts or extends the first and second portions of the rigid arms. Preferably, the actuating system consists of a rotary gear or hydraulic actuator connected to appropriate linkage to the rigid arms so that the first and second portions of the rigid arms may be folded in upon each other after the inflatable bags are deflated. The rigid arms and inflatable bags can then be stored compactly either underneath the aircraft or along its side in provided containment spaces. The first and second portions of the rigid arms are locked in place by locking hinges. Besides the inflatable bags mounted to the underside of the rigid arms, a second pair of inflatable bags to further cushion the landing of the aircraft may be sealably mounted to the top side of the rigid arms. This second pair of inflatable bags would deflate and compactly fold into the containment space for the system during cruise operation of the aircraft.

The inflatable air bags may be made to extend along the side of the aircraft for some length, or a plurality of smaller separate inflatable bags and rigid arms may be used. In either case, the storage of the bags and arms would be accomplished using the retracting and extension system described herein.

The rigid arms, in an alternative embodiment of the invention, may be made into three portions to further facilitate compact storage and retraction.

Accordingly, it is the object of the present invention to provide an air bag landing system for an aircraft which effectively cushions landing of the aircraft using inflatable bags which can be compactly stored in the fuselage of the aircraft.

A further object of the present invention is to provide an air bag landing system for an aircraft which has a relatively simple yet effective retraction and extension system.

Another object of the present invention is to provide an air bag landing system for an aircraft which can assist the recovery of remotely piloted aircraft on soft terrain or unimproved runways.

Still, another object of the present invention is to provide an air bag landing system for an aircraft which requires a relatively small volume for inflatable bag storage.

These and other objects and advantages of the present invention will become more apparent from the following detailed description when taken in conjunction with the attached drawings.

BRIEF DESCRIPTION OF THE DRAWINGS

FIG. 1 is an isometric view of a remotely piloted vehicle showing the inflatable bag extended to cushion landing.

FIG. 2 is an isometric view of a remotely piloted vehicle showing the inflatable air bag of the present invention in two segments.

FIG. 3 is a front view of a remotely piloted vehicle showing the apparatus of the present invention mounted in an underslung fashion and fully extended to cushion landing.

FIG. 4 is a front view of a remotely piloted vehicle showing the apparatus of the present invention mounted in a sideslung fashion and fully extended to cushion landing.

FIG. 5 is a front view of a remotely piloted vehicle showing the rigid arm of the present invention having three distinct segments.

FIG. 6 is a front view of the part of the fuselage of a remotely piloted vehicle showing the three sectioned embodiment of the apparatus of the present invention folded in a compartment within the aircraft.

FIG. 7 is a front view of part of the fuselage of a remotely piloted vehicle showing the first step in extending the three-sectioned embodiment of apparatus of the present invention to its position for landing.

FIG. 8 is a front view of part of the fuselage of a remotely piloted vehicle showing the second step in extending the three-sectioned embodiment of the apparatus of the present invention to its position for landing.

FIG. 9 is a front view of part of the fuselage of a remotely piloted vehicle showing the third step in extending the three-sectioned embodiment of the apparatus of the present invention to its position for landing.

FIG. 10 is a front view of part of the fuselage of a remotely piloted vehicle showing the two sectioned embodiment of the apparatus of the present invention folded in a compartment within the aircraft.

FIG. 11 is a front view of part of the fuselage of a remotely piloted vehicle showing the two sectioned embodiment of the apparatus of the present invention extended toward its landing position.

FIG. 12 is a front view of part of the fuselage of a remotely piloted vehicle showing the two sectioned embodiment of the apparatus of the present invention in its landing position.

DESCRIPTION OF THE PREFERRED EMBODIMENT

Referring to FIG. 1, a remotely piloted vehicle generally designated as 2 is shown. The vehicle 2 has wings 4 mounted to a fuselage 6. At the aft end of the vehicle 2, stabilizing fins 8 are located. A pair of vertical stabilizers are attached to fins 8. Mounted on the top of the fuselage 6 is engine 12 which is used to propel the vehicle 2.

Located in fuselage 6 is a compartment 14 which houses the air cushion assembly, generally designated as 16, which cushions landing of the vehicle 2. The air cushion assembly 16 is shown in its extended position in FIG. 1 used for landing of the vehicle 2.

Referring to FIG. 3, a more detailed view of air cushion assembly 16 is shown. Assembly 16 consists in part of a pair of rigid arms generally designated as 18. Arms 18 are symmetrical and the following description will be for only one arm. The other arm is alike in all its mechanical and operational aspects. Arm 18 is divided into three portions: a fore portion 20, a middle portion 22, and an aft portion 24. Aft portion 24 of rigid arm 18 is mounted to the fuselage 6 of the vehicle 2 by suitable mounting means (not shown). The aft portion 24 of the rigid arm 18 is then connected by suitable connecting means to the middle portion 22 of rigid arm 18. In turn, the middle portion 22 of rigid arm 18 is connected by suitable connecting means to fore portion 20. The connecting means are constructed so that the three portions of rigid arm 18 may be folded one upon the other.

Mounted in a sealed fashion to the underside of rigid arm 18 is inflatable bag 26. Inflatable bag 26 is inflated for landing purposes via duct 28 from a source (not shown) located within remotely piloted vehicle 2. The underside of inflatable bag 26 has suitable tread 30 such as standard rubber tire tread to reduce wear on the bag 26 during landing. Inflatable bags 26 may be inflated with any suitable gas, such as air, nitrogen or an inert gas.

Actuator 32 is attached to rigid arm 18, preferably to the aft portion 24, as shown in FIG. 3 and serves to initiate and complete extension and retraction of the air cushion assembly 18.

Actuator 32 may be a standard hydraulic actuator or a rotary gear driven actuator. Actuator 32 is connected to a power source (not shown) which causes actuation of its moving parts.

Referring to FIGS. 6, 7, 8, and 9, the extension of air cushion assembly 18 is shown in stages. FIG. 6 shows the entire assembly folded compactly in compartment 14. At this point the arm 34 of actuator 32 is extended. As the arm 34 of actuator 32 is retracted upon command to the vehicle 2, rigid arm 18 is withdrawn out of compartment 14, and still remains folded. At this point, the inflatable bag 26 mounted to the underside of the rigid arm 18 is inflated via duct 28. Inflation of bag 26 allows the middle portion 22 and fore portion 20 of rigid arm 18 to extend outward as shown in FIG. 8. Continued inflation of bag 26 results in full extension of the three portions of rigid arm 18. At full extension, the portions are locked into position by suitable locking hinges located at hinge points 36, 38, and 40. During landing the inflatable bag 26 cushions the impact of the remotely piloted vehicle 2 and prevents damage to the vehicle 2.

The cushion assembly 18 is retracted in the reverse sequence in relation to its extension. Inflatable bag 26 is deflated. The rod 34 of actuator 32 is extended, and as the rigid arm 18 is moved, the fore portion 20 folds inwardly upon the middle portion 22, which in turn folds upon the aft portion 24. The rod 34 of actuator 32 is further extended and the entire assembly 16 is moved to its storage compartment 14.

ALTERNATE EMBODIMENTS

The above description describes only one embodiment of the invention, and many other embodiments of the invention may be contemplated without departing from the scope of the inventive concept. One alternative to the assembly 16 and compartment shown in FIG. 1 is shown in FIG. 2. In FIG. 1, the compartment 14 extended for some length alongside of the fuselage 6 and was an integral compartment. Rigid arms 18 are spaced at appropriate distances to provide sufficient support for the relatively long inflatable bag shown in FIG. 1. As an alternative, a plurality of compartments 14 and assemblies 16 can be used. The advantage to this embodiment is that the inflatable bags can be made smaller, easier to handle, and easier to seal to rigid arm 18 without unduly sacrificing cushioning of the vehicle 2 upon landing.

Referring to FIG. 5, an alternative to the embodiment of the invention shown in FIG. 3, is illustrated. In this embodiment, the air cushion assembly 16 is mounted to the underside of fuselage 6. Compartments 14 serve to store the assembly 16. In function, the assembly 16 is similar to the assembly shown in FIG. 3. The assembly 16 remains stored in compartment 14 during cruise of the remotely piloted vehicle 2, and at landing the assembly is extended in a manner similar to that shown in FIGS. 6, 7, 8, and 9. In this embodiment an additional actuator 36 is mounted inside the vehicle 2. Actuator 36 has a rod 39 with a cable 40 attached to it. Cable 40 is anchored to the middle portion 22 of rigid arm 18 by anchor means 42. Actuator 36 and cable 40 are used to retract the rigid arm 18. Cable 40 pulls on the middle portion 22 of rigid arm 18 swinging that portion and fore portion 20 upward. The middle portion 22 and fore portion 20 then fold inwardly together. Actuator 32 which is mounted to aft portion 20 pushes the aft portion 24 of rigid arm 18 toward the compartment 14 along with the folded portions 20 and 22. As aft portion 24 is rotated downwardly, all three portions fold together and are stored in compartment 14.

Another embodiment of the invention is shown in FIG. 4. In this embodiment, rigid arm 18 has only two sections a fore section 44 and an aft section 46. The function of the air cushion assembly is identical to the function described in the previously discussed embodiment, that is, to cushion the remotely piloted vehicle upon landing. When extended for landing the fore portion 44, and aft portion 46 of rigid arm 18 are locked in position at their respective hinge points by suitable locking hinge means (not shown). Actuator 32 is connected to the aft portion 46 and serves to extend or retract the assembly 16. The assembly 16 fits into compartment 14 on the side of the fuselage 6 of the remotely piloted vehicle 2.

Extension of the assembly 16 is best shown in FIGS. 10, 11 and 12. FIG. 10 shows the assembly 16 stored in compartment 14. Movement of the actuator 32 causes the rigid arm 18 to swing outwardly. The fore portion 14 is further extended by inflating inflatable bag 26. At full extension the two portions of rigid arm 18 are locked in place. Retraction of the assembly follows the reverse order of extension, with actuator 32 causing rotation and folding of fore portion 44 and aft portion 46 into compartment 14.

Having thus described our invention, what we claim is:

1. An air bag landing system for an aircraft having a fuselage comprising:
   a. rigid member means having a first, second and third portion mounted to each side of the fuselage, said first, second and third portions being pivotally connected so that said first and second portions are pivotally connected to each other, said second and third portions are pivotally connected to each other, and said third portion is pivotally mounted to the fuselage to allow folding of said portions;
   b. inflatable bag means sealably mounted to the underside of said rigid member means;
   c. inflating means for inflating said inflatable bag means whereby said inflatable bag means is able to cushion the aircraft at landing;
   d. containment means for containing said rigid member means and said inflatable bag means during cruise operation so that said rigid member means forms a portion of the external surface of the fuselage while the inflatable bag means is completely within said containment means; and
   e. actuating means connected to the aircraft and to said rigid member means for extending said rigid member means and said inflatable bag means during landing and retracting said rigid member means and said inflatable bag means during cruise operation.

2. The combination of claim 1 wherein said inflatable bag means comprises a plurality of integral inflatable bags mounted to said rigid member means along each side of the fuselage of the aircraft.

* * * * *